US009531300B2

United States Patent
Harrison et al.

(10) Patent No.: US 9,531,300 B2
(45) Date of Patent: Dec. 27, 2016

(54) SINGLE PHASE CYCLOCONVERTER WITH INTEGRATED LINE-CYCLE ENERGY STORAGE

(71) Applicant: Enphase Energy, Inc., Petaluma, CA (US)

(72) Inventors: Michael J. Harrison, Petaluma, CA (US); Donald Richard Zimmanck, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 14/482,021

(22) Filed: Sep. 10, 2014

(65) Prior Publication Data

US 2015/0078053 A1   Mar. 19, 2015

Related U.S. Application Data

(60) Provisional application No. 61/878,393, filed on Sep. 16, 2013.

(51) Int. Cl.
*H02M 7/5387* (2007.01)
*H02M 1/36* (2007.01)
(Continued)

(52) U.S. Cl.
CPC ......... *H02M 7/53871* (2013.01); *H02M 5/297* (2013.01); *H02M 7/4807* (2013.01);
(Continued)

(58) Field of Classification Search
CPC ........ H02M 7/5387; H02M 1/32; H02M 1/38; H02M 1/34; H02M 3/33507; H02M 7/4807; H02M 2007/4815
(Continued)

(56) References Cited

U.S. PATENT DOCUMENTS 6,177,651 B1 * 1/2001 Reynolds ............. B23K 9/1068
219/130.1
6,330,170 B1 * 12/2001 Wang ...................... H02J 9/062
363/17
(Continued)

FOREIGN PATENT DOCUMENTS

JP          08080062 A     3/1996
JP          08168266 A     6/1996
KR       1020050009691 A  1/2005

OTHER PUBLICATIONS

Shimizu et al., "A Unity Power Factor PWM Rectifier With DC Ripple Compensation", Industrial Electronics, IEEE Transactions on, vol. 44, Issue 4, pp. 447-455, Aug. 1997.
(Continued)

*Primary Examiner* — Adolf Berhane
*Assistant Examiner* — Sisay G Tiku
(74) *Attorney, Agent, or Firm* — Moser Taboada (57) ABSTRACT

A method and apparatus for line-cycle storage of a single-phase cycloconverter. The method includes receiving input power from an input port of the singe-phase cycloconverter and monitoring an AC output port of the single-phase cycloconverter. The method measures energy stored in a line-cycle energy storage circuit coupled to one line of the AC output port of the single-phase cycloconverter, and determines a phase difference between a monitored AC voltage of the AC output port and the measured voltage of the line-cycle energy storage circuit. The method controls switches in the single-phase cycloconverter to selectively store energy in the line-cycle energy storage circuit based on the phase difference.

20 Claims, 5 Drawing Sheets

(51) Int. Cl.
*H02M 1/38* (2007.01)
*H02K 47/30* (2006.01)
*H02M 7/48* (2007.01)
*H02M 5/297* (2006.01)

(52) U.S. Cl.
CPC .... *H02M 2007/4815* (2013.01); *Y02B 70/145* (2013.01); *Y02B 70/1441* (2013.01)

(58) Field of Classification Search
USPC .......... 363/56.02–56.05, 132, 149, 152–153, 95,363/98
See application file for complete search history.

(56) References Cited

U.S. PATENT DOCUMENTS

| | | | | |
|---|---|---|---|---|
| 6,404,655 B1* | 6/2002 | Welches | ............ | H02M 7/53875 363/17 |
| 7,764,527 B2* | 7/2010 | Takayanagi | ........... | H02M 7/797 323/267 |
| 8,085,557 B2* | 12/2011 | Ito | ...................... | H02M 1/4233 363/17 |
| 2011/0305050 A1 | 12/2011 | Krein et al. | | |
| 2012/0014151 A1* | 1/2012 | Alexander | ............ | H02M 5/225 363/123 |
| 2012/0029320 A1* | 2/2012 | Watson | .............. | A61B 5/02125 600/301 |
| 2012/0170341 A1* | 7/2012 | Fornage | .............. | H02M 7/5387 363/132 |
| 2012/0257429 A1* | 10/2012 | Dong | .................. | H02M 3/1582 363/127 |
| 2012/0300524 A1 | 11/2012 | Fornage et al. | | |
| 2015/0168473 A1* | 6/2015 | Fornage | .............. | G01R 31/025 324/509 |

OTHER PUBLICATIONS

Li et al., "A Hard Switched High Frequency Link Converter With Constant Power Output for Photovoltaic Applications", Central Queensland University Institutional Repository, 2002.

Tsuno et al., "Optimization of The DC Ripple Energy Compensating Circuit on a Single-Phase Voltage Source PWM Rectifier", Power Electronics Specialists Conference, 2004. PESC 04. 2004 IEEE 35th Annual, vol. 1, pp. 316-321, Jun. 2004.

Bush et al., "A Single-Phase Current Source Solar Inverter with Reduced-Size DC Link", Energy Conversion Congress and Exposition, 2009. ECCE 2009. IEEE, pp. 54-59, Sep. 2009.

Hu et al., "A Review of Power Decoupling Techniques for Microinverters With Three Different Decoupling Capacitor Locations in PV Systems", Power Electronics, IEEE Transactions on, vol. 28, Issue 6, pp. 2711-2726, Jun. 2013.

PCT Search Report and Written Opinion, PCT/US2014/055545, 10 Pages, Date of Mailing Dec. 16, 2014.

* cited by examiner

SINGLE PHASE CYCLOCONVERTER WITH INTEGRATED LINE-CYCLE ENERGY STORAGE

CROSS-REFERENCE TO RELATED APPLICATION

This application claims priority to U.S. Provisional Patent Application No. 61/878,393 filed on Sep. 16, 2013, which is incorporated by reference herein in its entirety.

BACKGROUND OF THE INVENTION

Field of the Invention

Embodiments of the present disclosure relate generally to a single-phase cycloconverter with integrated line-cycle energy storage.

Description of the Related Art

Power converters are often used in power generation for distributed generators such as photovoltaic (PV) panels or modules that produce DC voltage. The PV modules are conventionally connected in series and generate power at varying rates depending on operating factors such as the environment. Micro-inverters are a form of power converters that are capable of converting DC power generated by the PV modules into AC power.

However, typical power converter designs apply large input capacitors on the DC input port that produce pulsating power transfer through the power converter. Such a topology may use large aluminum electrolytic capacitors that are susceptible to heat degradation. Such input capacitors also limit the minimum physical size of a converter as well as the maximum operating temperature, and overall operational lifetime of the converter.

Thus, there is a need for a converter capable of generating constant power with smaller capacitors and decreased ripple current.

SUMMARY OF THE INVENTION

Embodiments of the present invention generally relate to an apparatus for a single-phase cycloconverter with integrated line-cycle energy storage and filtering substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention are directed to a cycloconverter configurable to operate with AC line frequency energy storage. In some embodiments, the cycloconverter is configured to be either a single-phase or three-phase output using the AC line frequency energy storage. The cycloconverter may be a part of a resonant converter, DC-AC inverter, and the like. A line frequency energy storage device such as a capacitor is coupled to the cycloconverter output across two of the three-phase connections. The voltage and current waveforms of the capacitor is maintained at a predetermined phase difference compared to the AC mains coupled to the cycloconverter. The result is an increase the power generation capacity of the cycloconverter, and allows for constant power transfer through the power converter. In addition, the line frequency energy storage device may be configured to provide electromagnetic compliance (EMC) and surge filtering. As will be discussed further below, other embodiments of the topologies discussed herein may be operated in reverse to convert AC power to a constant DC output.

In some embodiments, the line frequency energy storage device is integrated within the cycloconverter. In other embodiments, the line frequency energy storage device is coupled via a cable (e.g., Electrical Trunk and Drop (ETD) power cable). The cable is external to the cycloconverter and to be coupled between the cycloconverter and load (e.g., AC mains). An external configuration reduces the size of the cycloconverter, reduces heating limitations, and improves serviceability and maintenance. In such an embodiment, locating the line frequency energy storage device outside the cycloconverter (and resonant converter) allows for a modular implementation of the cycloconverter to output power as a single-phase. In other words, in some embodiments the converter is configured to operate with the attached line frequency energy storage device to provide a single-phase cycloconverter operation and without the attached line frequency energy storage device to operate as a three-phase cycloconverter.

Figure 1:
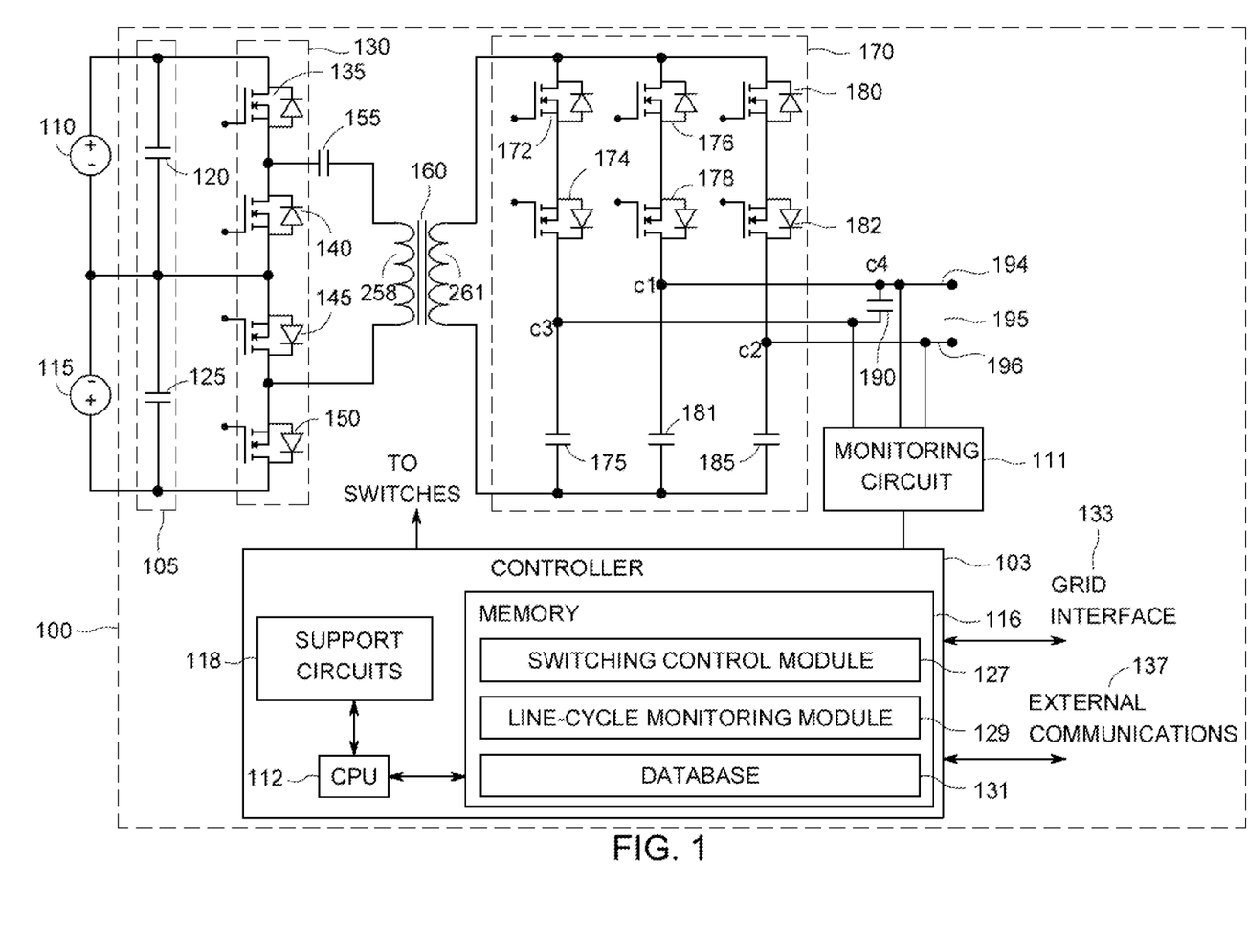
FIG. 1 is a block diagram of a converter system with a controller in accordance with one or more embodiments of the present invention.

FIG. 1 is a block diagram of a converter system 100 with a controller 103 in accordance with one or more embodiments of the present invention. The converter system 100 comprises a cycloconverter 170, controller 103, a DC port 105, a DC bridge circuit 130, a tank capacitor 155, a transformer 160, a line-cycle energy storage capacitor 190, an AC port 195, and a monitoring circuit 111.

The DC port 105 comprises capacitors 120 and 125 coupled to DC sources 110 and 115 such as distributed generators (e.g., PV modules, wind turbines, and the like).

The capacitors 120 and 125 are further coupled to the DC bridge circuit 130. In alternative embodiments, where the converter system 100 is operated in reverse (i.e., to supply DC power), DC sources 110 and 115 represent DC loads for receiving converted AC power.

The DC bridge circuit 130 comprises switches 135, 140, 145, and 150. The switches 135 and 140 are coupled in series across terminals of the capacitor 120 to form a first half-bridge circuit. The drain of the switch 135 and the source of the switch 140 is coupled to a first terminal of the tank capacitor 155. A second terminal of the tank capacitor 155 is coupled to a first terminal of a primary winding 258 of the transformer 160. The drain of switch 140 is coupled to the drain of switch 145. Switches 145 and 150 are coupled in series across capacitor 125 to form a second half-bridge circuit that is coupled to a second terminal of the primary winding 258 of the transformer 160. A secondary winding 262 of transformer 160 is coupled to the cycloconverter 170.

The cycloconverter 170 comprises switches 172, 174, 176, 178, 180, 182; capacitors 175, 181, 185. In some embodiments, the line-cycle energy storage capacitor 190 is integrated within the cycloconverter 170 and in other embodiments is coupled to the output of the cycloconverter 170. Switches 172 and 174 are serially coupled, and the drain of switch 174 is coupled to a node c3 and to a terminal of the capacitor 175. The node c3 is coupled between switch 174 and capacitor 175. The node c3 is also coupled to a first terminal of the line-cycle energy storage capacitor 190. Switches 176 and 178 are serially coupled, and the drain of switch 178 is coupled to a node c1, a node c4, and to a terminal of the capacitor 181. The node c4 is coupled to a second terminal of the line-cycle energy storage capacitor 190. The node c1 is coupled to a first line 194 of the AC port 195. Switches 180 and 182 are serially coupled and the drain of switch 182 is coupled to a node c2 and a terminal of the capacitor 185. The node c2 is also coupled to a second line 196 of the AC port 195.

In some embodiments, the switches in the converter system 100 may be transistors switched at 3 kHz to 10 MHz and operated by the controller 103. The transistors may alternatively be any other suitable electronic switch, such as junction gate field effect transistors (JFET), metal-oxide-semiconductor controlled thyristors (MCT), insulated gate bipolar transistors (IGBTs), bipolar junction transistors (BJTs), n-type MOSFETs, gate turnoff thyristors (GTOs), and the like.

The line-cycle energy storage capacitor 190 in the converter system 100 allows a DC bridge 130 to process a larger range of power (e.g., 500-600 Watts). Sizing of the capacitor depends on the system coupled to the AC port 195. For example, a 600 VA converter system 100, would require the line-cycle energy storage capacitor 190 to have a capacity of 36 microFarads (μF) for coupling the AC port 195 to an AC mains of 230 VAC/50 Hz.

In other embodiments, instead of the line-cycle energy storage capacitor 190 coupled at nodes c3 and c4, the line-cycle energy storage capacitor 190 may be coupled at nodes c3 and c2 for AC output to the second line 196 of the AC port 195. In such an embodiment, node c1 and the first line of the AC port 195 is coupled to the source of switch 174.

The monitoring circuit 111 comprises voltage and current sampling circuitry (not shown) configured to measure voltage and current over time. The monitoring circuit 111 is coupled to nodes c1, c2, c3, and c4 to measure voltage and current across the line-cycle energy storage capacitor 190 and the AC port 195. The measurements are used by the controller 103 to operate the switches in the converter system 100 to output single-phase AC to the AC port 195 and control the energy flow through the line-cycle energy storage capacitor 190. In some embodiments, during full power operation, the controller 103 regulates the voltage and energy of the line-cycle energy storage capacitor 190 to match the magnitude but lag the voltage and current of an AC source (e.g., AC mains) coupled to the AC port 195. During a discharge period, the energy stored in the line-cycle energy storage capacitor 190 is supplied to the first line 194 of the AC port 195. In other embodiments, of less than full power (e.g., ¼ power), the line-cycle energy storage capacitor 190 is regulated to store proportionately less energy.

The converter system 100 receives DC input on the DC port 105. The DC bridge circuit 130 converts the DC power to a square wave that is coupled to the tank capacitor 155 and transformer 160. The transformer 160 converts the voltage magnitude (i.e., steps up or steps down voltage) and couples the power to the cycloconverter 170.

The controller 103 includes a central processing unit (CPU) 112, a memory 116, and various support circuits 118. The CPU 112 may include one or more microprocessors known in the art, and/or dedicated function processors such as field programmable gate arrays (FPGAs) programmed to perform dedicated processing functions. The CPU 112 is coupled to the memory 116, and support circuits 118. The support circuits 118 for the CPU 112 may include micro-controllers, application specific integrated circuits (ASIC), cache, power supplies, clock circuits, data registers, input/output (I/O) interface, and the like.

The memory 116 stores non-transient processor-executable instructions and/or data that may be executed by and/or used by the CPU 112. These processor-executable instructions may comprise firmware, software, and the like, or some combination thereof. Modules having processor-executable instructions that are stored in the memory 116 comprise a switching control module 127, a line-cycle monitoring module 129, and a database 131.

In an exemplary embodiment, the memory 116 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like. The controller 103 may be implemented using a general purpose computer that, when executing particular software, becomes a specific-purpose computer for performing various embodiments of the present invention.

The line-cycle monitoring module 129 receives analog or digital data of voltage and current samples measured from the monitoring circuit 111. In some embodiments, the measurement for the AC port 195 is a measurement of the AC mains (not shown) coupled to the AC port 195. In other embodiments, the measurements of AC mains may be received directly by the controller 103 via a grid interface 133. For explanatory purposes, the AC port 195 will be discussed herein with in terms of coupling to the AC mains. Those of skill in the art will recognize coupling to other types of loads.

The switching control module 127 is communicatively coupled to the line-cycle monitoring module 129 for receiving data used to control switches in the converter system 100. The switching control module 127 coordinates timing of the switches in the cycloconverter 170 based on measurements from the monitoring circuit 111. The switching control module 127 may control the cycloconverter 170 by pulse width modulation (PWM). In embodiments wherein the DC port 105 is coupled to a PV module, the switching control module 127 may execute instructions for maximum power point tracking (MPPT).

The switching control module 127 controls the switches of the cycloconverter 170 to generate a single-phase AC output that is coupled to the AC port 195. The switching control module 127 also controls the current being delivered to and from the line-cycle energy storage capacitor 190 such that the sum of the power function being drawn off the mains and the power function drawn in and out of the line-cycle energy storage capacitor 190 is a constant. In other words, a constant DC power flows through the converter system 100.

The switching control module 127 maintains the magnitude of the voltage across the line-cycle energy storage capacitor 190 near the voltage measured on the AC mains. The voltage of the line-cycle storage 190 will however, be phase shifted compared to the voltage measured of the AC mains (e.g., by 45 degrees). Phase shifting may be adjusted by controlling the timing between switching states and PWM of individual switches in cycloconverter 170.

The switching control module 127 also controls energy flow to the line-cycle energy storage capacitor 190 such that the current drawn from the line-cycle energy storage capacitor 190 will similarly advance or lag the current of the AC mains (e.g., by 135 degrees). In full power operation, the amount of power flow (i.e., current magnitude) to the line-cycle energy storage capacitor 190 is further controlled to match the magnitude of the AC mains.

The switching control module 127 controls the cycloconverter 170 to cycle power through (i.e., charge and discharge) the line-cycle energy storage capacitor 190 so as to output power that is sinusoidal to the AC port 195 and to the AC mains. In an embodiment where the line-cycle energy storage capacitor 190 is a capacitor (as opposed to another energy storage means), the size of the capacitor is given by Equation 1:

$$\text{Energy Storage} = VA/(2\pi f v^2) \qquad (1)$$

In the above Equation 1, VA is equal to the AC mains VA rating, f is equal to the frequency of the AC mains and v is equal to the voltage of the AC mains. Generally, the line-cycle energy storage capacitor 190 is sized to ensure the magnitude of the voltage generated across it at the full VA operating point is the same as the AC mains voltage magnitude, where the capacitance value is equal to Equation (1). At full power operation, the peak-to-peak magnitude of the voltage applied to the line-cycle energy storage capacitor 190 matches the peak-to-peak mains voltage. The peak-to-peak magnitude of the currents for the mains phase and the line-cycle energy storage capacitor 190 are also of equal value. The converter system 100 may be operated at a lower power (e.g., ¼ power) with that same capacitor value.

For a ¼ power operating point, the line-cycle energy storage capacitor 190 has a peak-to-peak voltage that is half the mains peak-to-peak voltage and ¼ of the voltage magnitude during full power operation. The magnitude of the current for line-cycle energy storage capacitor current magnitude is also half the value of that found in the full power operation. In alternative embodiments, the line-cycle energy storage capacitor 190 may be sized for less than full power and the controller 103 maintains a corresponding lower operating voltage and current for the line-cycle energy storage capacitor 190.

Continuing the example, reactive power control of the line-cycle energy storage capacitor 190 is provided by Equation 2:

$$\text{Capacitor Phase Shift} = \pm 45° + \theta/2 \qquad (2)$$

The power angle θ is the desired phase shift between the mains voltage and the mains current to achieve a particular reactive power control (e.g., constant output power). In operation, two sinusoidal waveforms that are 90° apart are summed to ensure constant output power from the converter system 100. One sinusoidal waveform is the energy flow through the line-cycle energy storage capacitor 190, and the other is the energy flow to the AC port 195. As will be discussed further below with respect to FIG. 4, the power functions drawn off the line-cycle energy storage capacitor 190 and the mains phase have an equal peak-to-peak magnitude, but are 90° apart.

Following Equation 2, the switches in the cycloconverter 170 are controlled such that the voltage waveform of the line-cycle energy storage capacitor 190 is sinusoidal and delayed or advanced by 45 degrees plus half the desired power angle with respect to the AC mains voltage waveform (i.e., ±45°+θ/2). The current waveform through the line-cycle energy storage capacitor 190 has a phase difference of 135 degrees plus half the power angle with respect to the AC mains (i.e., ±135°+θ/2). In some embodiments, the controller 103 controls the timing of the switches in the cycloconverter 170 to adjust the current flow through the line-cycle energy storage capacitor 190 to reach the phase shift (±45°) of the voltage on the line-cycle energy storage capacitor 190 with respect to the AC mains.

For generating real power, the power angle θ is zero, and for generating reactive power, the power angle θ is the desired phase shift between the AC mains current and voltage. The switching control module 127 also maintains the energy flow to and from the line-cycle energy storage capacitor 190 at a magnitude matching the magnitude of the energy flow to the AC mains phase connection (i.e., AC port 195).

In alternative embodiments, the cycloconverter 170 may be operated in reverse such that the AC port 195 receives AC power for conversion to DC power and output to the DC port 105. The reverse power flow may be either real power flow or reactive power flow. As with forward operation, in reverse operation, the line-cycle energy storage capacitor 190 similarly ensures that power delivered out of the DC port 105 is continuous and without voltage or current ripple regardless the power drawn from the AC port is pulsating at twice the line frequency. In the reverse conversion operation, the switches in the cycloconverter 170 are controlled such that the currents being controlled for both the mains phase and the line-cycle energy storage capacitor 190 are reversed. In other words, in the converter system 100 discussed above, where a current of the line-cycle energy storage capacitor 190 was lagging the AC mains, the current will be leading and vice versa (i.e., if leading in a forward operation, becomes lagging in a reverse operation).

The database 131 stores information of the converter system 100 and data from external communications 137. External communications 137 may be facilitated by communications equipment for wireless, wired, and power line communication (PLC) to an additional device such as a gateway (not shown). In some embodiments, the database 131 stores additional information about the load (i.e., DC requirements, AC requirements, AC output frequency, and the like).

The line-cycle energy storage capacitor 190 may be a capacitor that is sized appropriately (e.g., 15 uF for the cycloconverter that is a 250 W micro-inverter). As will be discussed further below, the capacitor may also be split into two separate capacitors and provide a filtering function along with inductors. In an alternative embodiment, the line capacitor may be located at a system level (i.e., external to the converter) using commonly available (induction) "motor run" capacitors. Locating this capacitor at the system level outside the cycloconverter 170 also allows the converter and line frequency capacitor to be easily serviceable. In such embodiments, replacing the capacitor becomes easier as a modular piece of the respective converter circuits. Similarly, in other embodiments, the attachment or detachment of the capacitor changes the AC port 275 from a single phase to three phase output respectively, and the converter system 100 may be configured to generate the appropriate output.

Figure 2:
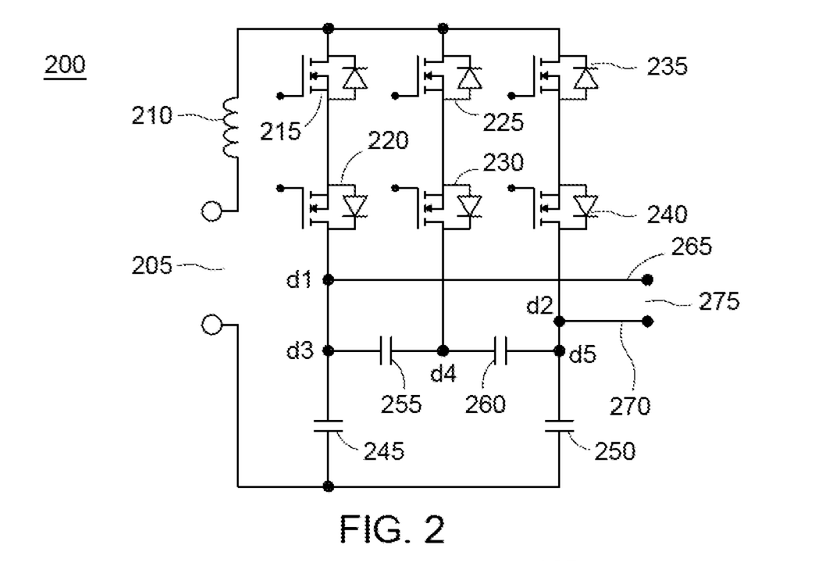
FIG. 2 is a schematic diagram of a converter in accordance with one or more embodiments of the present invention.

FIG. 2 is a schematic diagram of a single-phase cycloconverter 200 whereby the line frequency energy storage capacitors are split and connected such that they form an effective filter function thereby simplifying the capacitive filtering and the overall EMC filter design requirements in accordance with one or more embodiments of the present invention. The single-phase cycloconverter 200 is operated by the controller 103 as described above in FIG. 1 as part of the converter system 100 with sampling from the monitoring circuit 111.

The single-phase cycloconverter 200 comprises a DC port 205, an inductor 210, switches 215, 220, 225, 230, 235, and 240; capacitors 245 and 250; line frequency energy storage capacitors 255 and 260; and an AC port 275. The DC port 205 is coupled to the inductor 210 and a second terminal of the capacitor 245. The inductor 210 is coupled to the drain of switches 215, 225, and 235. The switches 215 and 220 are serially coupled and the drain of switch 220 is coupled to a node d1, a node d3, and a first terminal of the capacitor 245. The node d1 is further coupled to a first line 265 of the AC port 275. The node d3 is coupled to a first terminal of the line frequency energy storage capacitor 255. The switches 225 and 230 are serially coupled and the drain of switch 230 is coupled to a node d4. The node d4 is coupled to a second terminal of the line frequency energy storage capacitor 255 and a first terminal of the line frequency energy storage capacitor 260. The switches 235 and 240 are serially coupled, and the drain of switch 240 is coupled to a node d2, a node d5, and a terminal of the capacitor 250. The node d2 is coupled to a second line 270 of the AC port 275. The node d5 is coupled to a second terminal of line frequency energy storage capacitor 260. The line frequency energy storage capacitors 255 and 260 may be of equal capacity (e.g., 18 μF each) or of different capacities.

A controller (e.g., controller 103) operates the switches 215, 220, 225, 230, 235, 240 based on measurements of current and voltage sampled by a monitoring circuit (not shown) but substantially similar to the monitoring circuit 111 in FIG. 1. The monitoring circuit samples voltage and current from the line frequency energy storage capacitors 255 and 260 and the AC port 275. In some embodiments, the monitoring circuit is coupled to nodes d1, d4, and/or d2.

In operation, the single-phase cycloconverter 200 is operated by the controller 103 discussed above in FIG. 1 to supply AC power to the AC port 275 by cycling energy from the switches 215, 220, 225, 230, 235, 240 to and from the line frequency energy storage capacitors 255 and 260. The line frequency energy storage capacitors 255 and 260 also provide filtering of ripple current or voltage to the AC port 275. By coupling the line frequency energy storage capacitors 255 and 260 to nodes d3, d4, and d5; the energy on the line frequency energy storage capacitors 255 and 260 may be controlled by the controller 103 to provide EMC, surge, and line cycle energy storage functions.

In addition, a capacitive reactive power bias is calculated by the controller 103 to determine the power factor (PF) that the single-phase cycloconverter 200 will operate with maximum efficiency and perform advanced grid functions (AGF). AGF requires PV inverters have the capability to supply or absorb reactive power. The power factor that a converter (and thus the single-phase cycloconverter 200) is biased will determine where the converter will operate most efficiently when coupled to a DC source (e.g., PV module) at the DC port 205. Reactive power factors may be calculated with regard to inductive and capacitive PFs. For example, with two equally size line frequency energy storage capacitors 255 and 260, the capacitive reactive power bias may be calculated as cos(arc sin 0.25)=0.968 pf at full power operation.

Continuing the example, based on the natural bias of 0.986 pf., the converter operating with a 90% derating would be able to cover a reactive power range of 0.94 pf. inductive through to 0.86 pf capacitive. The range of reactive power control may be calculated using the required maximum inductive reactive PF. The required inductive PF adjustment may be calculated where the PF that is the required is the maximum inductive PF, by Equation 3:

$$\text{Required PF for inverter} = \cos(\arcsin(5 \sin(\arccos(PF))/4)) \tag{3}$$

Similarly, a required capacitive reactive PF adjustment may be calculated by Equation 4:

$$\text{Maximum capacitive PF} = \cos(\arcsin(3 \sin(\arccos(PF))/2)) \tag{4}$$

In Equation 4 above, the PF is also the required maximum inductive PF. The line frequency energy storage capacitors 255 and 260 are effectively coupled across the AC port 275. Equations 3 or 4 may thus be applied by the controller 103 to ensure a maximum efficiency operation by calculating the capacitive reactive power bias. In such an embodiment, the controller 103 also monitors the AC port 275 to calculate and determine changes in power factor.

Figure 3:
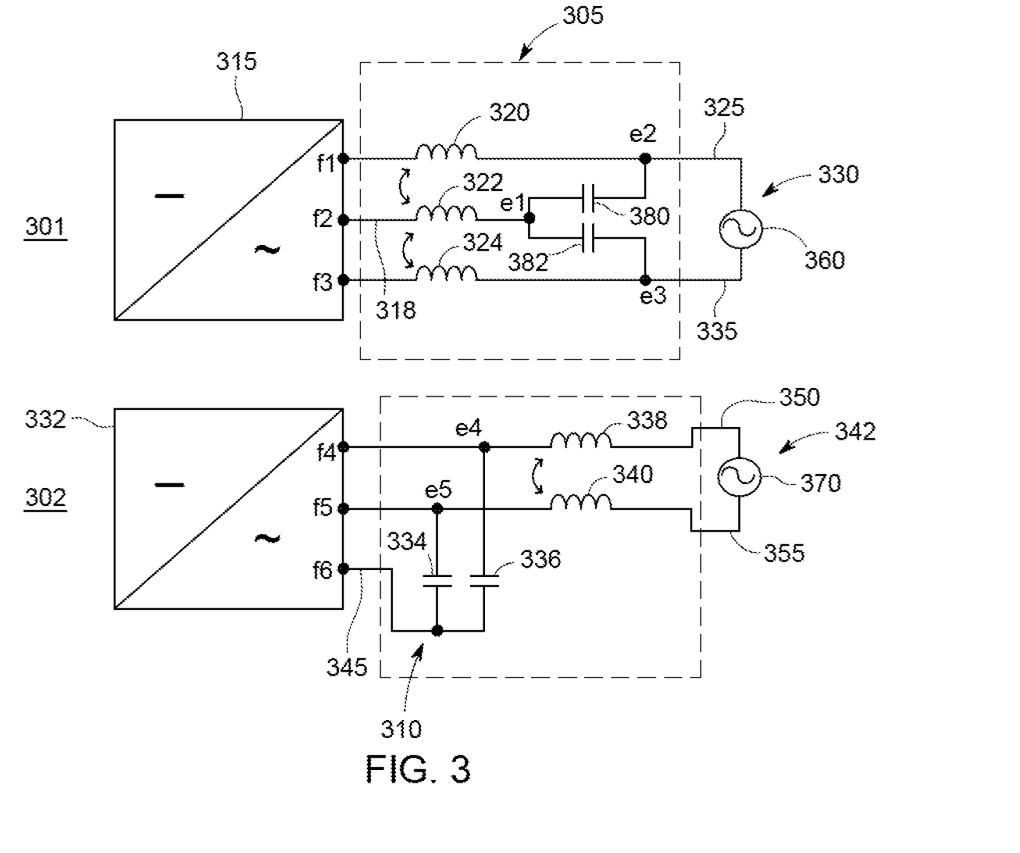
FIG. 3 is a block diagram of two exemplary combined line-cycle storage and filter circuits in accordance with one or more embodiments of the present invention.

FIG. 3 is a block diagram of two exemplary combined line-cycle storage and filter circuits 305 and 310 in accordance with one or more embodiments of the present invention. The filter circuits 305 and 310 are controlled by controller 103 discussed above in FIG. 1 to either receive or output a single-phase AC power. The controller 103 directly controls switches in the AC converter circuits 315 and 332. The filter circuit 305 is a three-phase filter and the filter circuit 310 is a single-phase filter.

A first system 301 comprises the AC converter circuit 315 and combined line-cycle storage and filter circuit (hereinafter "circuit") 305. The circuit 305 comprises EMC/surge inductors 320, 322, and 324; line frequency energy storage capacitors 380, and 382; and an AC port 330. The AC port 330 is coupled to an AC grid 360 that may represent the commercial AC grid. The AC converter circuit 315 is coupled to the EMC/surge inductors 320, 322, and 324 via ports f1, f2, and f3. The port f1 is coupled to the EMC/surge inductor 320 is also coupled to a line 325 and a node e2. The port f2 is coupled to a line 318 and the EMC/surge inductor 322 and a node e1. The port f3 is coupled to EMC/surge inductor 324 that is further coupled to a line 335 and a node e3. The node e1 is coupled to a terminal of line frequency energy storage capacitors 380 and 382. The node e2 is coupled to the other terminal of the line frequency energy storage capacitor 380. Node e3 is coupled to the other terminal of the line frequency energy storage capacitor 326.

The AC converter circuit 315 (e.g., a cycloconverter) outputs three-phase power to lines 325, 318, and 335 via output ports f1, f2, and f3. As described in FIG. 1, the controller 103 controls the operation of switches in the AC converter circuit 315 to control the energy to the line frequency energy storage capacitors 380 and 382 to be phase shifted but as the same magnitude of the AC grid 360 that is monitored (e.g., by monitoring circuit 111). The EMC/surge inductors 320, 322, and 324 and line frequency energy storage capacitors 380 and 382 operate as EMC and surge filters in addition to providing constant power to the AC port 330.

A second system 302 comprises an AC switching circuit 332 and combined line-cycle storage and filter circuit (hereinafter "circuit") 310. The circuit 310 comprises surge inductors 338, and 340; line frequency energy storage capacitors 334, and 336; and an AC port 342. The AC port 342 is depicted as coupled to an AC grid 370 that may represent the commercial AC grid.

The AC converter circuit 332 is coupled to the circuit 310 via ports f4, f5, and f6. The port f4 is coupled to a node e4, the surge inductor 338, and a line 350 of the AC port 342. The port f5 is coupled to a node e5, the surge inductor 340 and a line 355 of AC port 342. The port f6 is coupled to a line 334 that is coupled to terminals of the line frequency energy storage capacitors 334 and 336. The node e4 is coupled to the other terminal of line frequency energy storage capacitor 336 and the node e5 is coupled to the other terminal of line frequency energy storage capacitor 334.

The EMC/surge inductor 320 is coupled to a line 325 and a node e2 coupled to a terminal of the line frequency energy storage capacitor 380. The EMC/surge inductor 322 is coupled to a line 318 and a node e1. The node e1 is coupled to a terminal of line frequency energy storage capacitors 380 and 382. The EMC/surge inductor 324 is coupled to a line 335 and a node e3 coupled to a terminal of the line frequency energy storage capacitor 326.

The AC switching circuit 332 (e.g., a cycloconverter) outputs three-phase power to lines 350, 345, and 355. As described in FIG. 1, the controller 103 controls the operation of switches in the AC converter circuit 332 to control the energy to the line frequency energy storage capacitors 334 and 336 to be phase shifted but at the same magnitude of the AC grid 370 that is monitored (e.g., by monitoring circuit 111). The EMC/surge inductors 338 and 340 and the line frequency energy storage capacitors 334 and 336 operate as EMC and surge filters in addition to providing constant power to the AC port 360.

Figure 4:
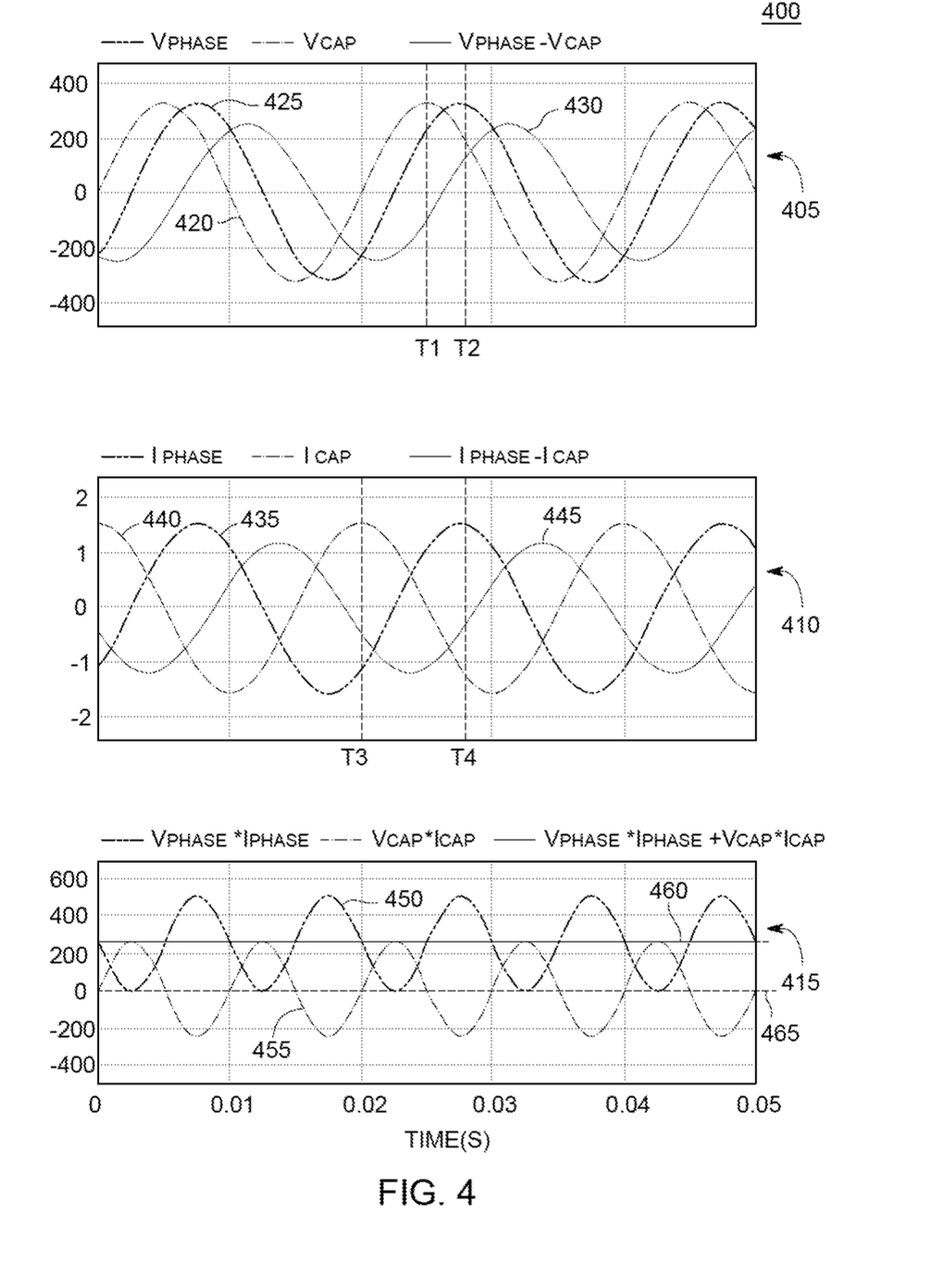
FIG. 4 is a graph of simulation waveforms for the line frequency energy storage and AC source at full power in accordance with one or more embodiments of the present invention.

FIG. 4 is a set 400 of graphs for the line frequency energy storage and AC source at full power in accordance with one or more embodiments of the present invention. The graphs 405, 410, and 415 are plots of the operation of the single-phase cycloconverter as monitored and operated by the controller 103 as described above in FIG. 1 and coupled to the AC mains (i.e., utility grid).

For the ease of simplifying the explanation, the graphs will be discussed with respect to FIG. 1 but one of skill in the art may apply further topologies in FIGS. 2 and 3. A "middle" leg (e.g., node c1 in FIG. 1 is connected to both the line cycle energy storage capacitor 190 and the line 194 of the AC port 195) is used as the point of reference for all the following graphs. In this way the cycloconverter 170 can be thought of as operating as a quadrature two-phase AC supply. One phase being the AC mains phase, and the quadrature second phase is from the line-cycle energy storage capacitor 190.

The graph 405 is a plot of voltage over time. Voltage signal 420 is the voltage across a line side capacitor (e.g., line-cycle energy storage capacitor 190), voltage signal 425 is the voltage of the AC mains, and voltage signal 430 is the difference between voltage signal 420 and 425. Observing the voltage signal 420 and 425, the voltage of line-cycle energy storage capacitor 190 lags the AC mains. At time T1, voltage signal 420 peaks and at time T2, voltage signal 425 peaks with a difference from the peak-to-peak values of 45 degrees. The peak-to-peak magnitude of the voltage signals 420 and 425 is the same (e.g., 230 VAC). In addition, when viewed in conjunction with the current of the line frequency energy storage capacitor 190 (signal 440), the voltage and current on the line frequency energy storage capacitor 190 are 90 degrees out of phase at times T1 and T3 since the line frequency energy storage capacitor 190 is a reactive element.

These phase shifts are a product of coordinating switches in the cycloconverter 170 by the controller 103 to control energy to and from the line-cycle energy storage capacitor 190. In other embodiments, the voltage of line-cycle energy storage capacitor 190 may lead the AC mains voltage by 45 degrees. To ensure the 45 degree difference is constant, the respective currents are controlled to be 135 degrees out of phase such that the current of line-cycle energy storage capacitor 190 is lagging the current of the AC mains phase (signal 435) as shown in the graph 410. Thus controlling the current on line-cycle energy storage capacitor 190 (shown as signal 440 in the graph 410) produces the consequential voltages signals in the graph 405.

The graph 410 is a plot of currents over time. Signal 440 is the current of the line-cycle energy storage capacitor 190, signal 435 is the current of the AC mains, and signal 445 is the difference between the currents. The current from the AC mains is drawn at a unity power factor. As seen from time period T3 to time period T4, the current of line-cycle energy storage capacitor 190 is lagging the current of the AC mains by 135 degrees. In other embodiments, the current of line-cycle energy storage capacitor 190 may be controlled to lead the AC mains by 45 degrees.

The graph 415 is a plot of power over time. Signal 450 is the power (Vphase*Iphase) of the AC mains and signal 455 is the power of the line-cycle energy storage capacitor 190. Signal 450 is the sinusoidal power function associated with the power drawn off the mains and has a frequency of twice the line frequency of either the voltage or current. The power drawn off the AC mains is unipolar with a maximum and minimum power of 500 W and 0 W, with an average of 250 W (line 460).

Signal 455 represents the power function (Vcap*Icap) of the power drawn off line-cycle energy storage capacitor 190 which also has twice the line frequency. The power drawn off line-cycle energy storage capacitor 190 is bipolar with power between +250 W and −250 W with an average of 0 W (line 465). Thus, the average power drawn off the AC mains phase is 250 W, and the average power drawn off line-cycle energy storage capacitor 190 is 0 W because continuous power cannot be drawn from a capacitor, only used to circulate power into or out of the capacitor. From graph 415, when the two power functions (signals 450 and 455) are summed together, a constant 250 W power flow is produced (shown as line 460). In an embodiment including a PV module, the 250 W would then be the power drawn from the PV module while supplying a sinusoidal power to the AC mains.

The control for real power export involves controlling the current being delivered into line-cycle energy storage capacitor 190 such that the magnitude of the energy flow into line-cycle energy storage capacitor 190 always matches the magnitude of the energy flow to the mains phase connection. The fundamental basis for control has been explained on a basis of maintaining a 45 degree difference between the voltage being applied to the line-cycle energy storage capacitor 190 and the mains phase voltage.

Further still are embodiments where the voltage of line-cycle energy storage capacitor 190 is shifted by 135 degrees (lagging or leading), and the current is shifted by 45 degrees (lagging or leading). Such a transposition results in voltage signals that are balanced, yet current signals would require a determination of voltage stress between the legs of the cycloconverter 170. In such an embodiment, by controlling the voltage to be balanced instead of the depicted current in graph 410, there is an increased peak current stress on the converter system 100.

In embodiments where the voltages applied to the line-cycle energy storage capacitor 190 and the mains phase voltage have a phase separation of 135°, the peak voltage stress between the mains and capacitor legs of the cycloconverter is higher than the peak mains phase voltage stress. As such, the voltage rating of the switching transistors needs to be higher than in embodiments where a 45° phase separation between the voltages is used. In addition, currents drawn from the three respective cycloconverter legs are less evenly spread out than where the voltage separation is 135°, resulting in higher resistive losses than when the voltage separation is 45°.

Further embodiments also can be reversed via control theory for instances where reverse power flow is necessary. This converter can be controlled to achieve reverse power flow with either real power flow or reactive power flow. In this mode the converter acts as an AC to DC converter and the energy storage at the AC port (e.g., via line-cycle energy storage capacitor 190) of the converter ensures that the power being delivered from the DC port is continuous (without voltage or current ripple) even though the power being drawn from the AC port is pulsating at twice the line frequency. The reverse power flow control logic is identical to the DC-AC power flow control logic for both the real power and reactive power flow cases with one difference—the currents being controlled for both the mains phase and the line-cycle energy storage capacitor 190, both need to be reversed. For AC to DC conversion, since line-cycle energy storage capacitor 190 is at the output of the converter 100 there is reduced ripple. Furthermore, since power can be constantly drawn from the AC mains with the line frequency capacitor, ripple voltage is substantially eliminated at the DC output port.

Figure 5:
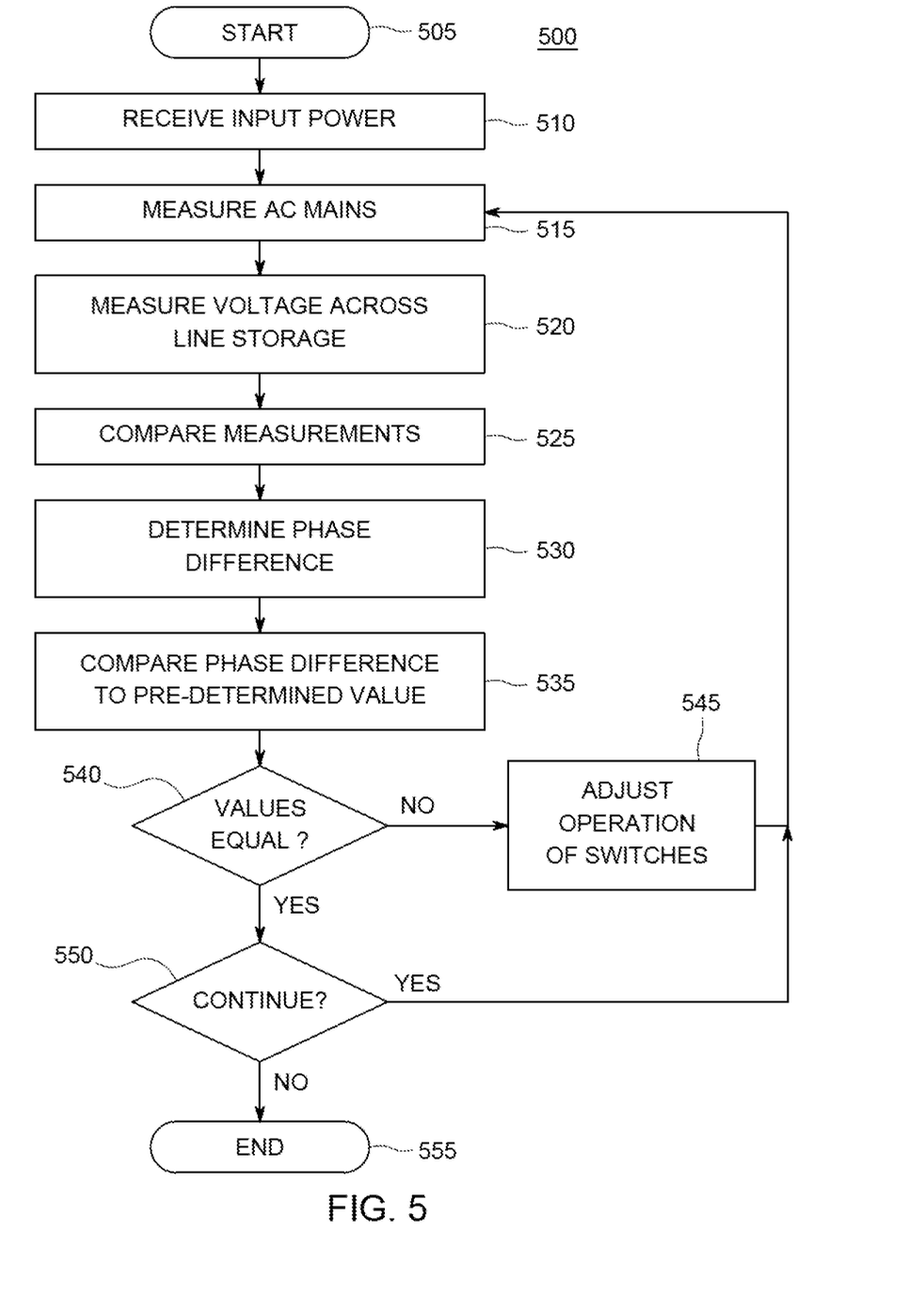
FIG. 5 is a flow diagram of a method for line-cycle energy storage in a single-phase converter in accordance with one or more embodiments of the present invention.

FIG. 5 is a flow diagram of a method 500 for line-cycle energy storage in a converter in accordance with one or more embodiments of the present invention. The method 500 is implemented by the converter system 100 described above in FIG. 1. The method 500 will be described in forward operation for converting received DC power to AC power. However, additional embodiments include reverse operation and receiving AC power for conversion to DC power. The method 500 describes a full power operation mode where the peak-to-peak magnitude of voltage applied to line storage matches the mains voltage and the currents of the mains phase and line storage are equal.

Alternative embodiments of reduced power operation include adjusting the voltage magnitude across the line storage accordingly. For example, in ¼ power operation, the voltage magnitude across the line storage is ½ the mains voltage magnitude. The magnitude of current through the line storage is ½ the current of full power operation and the mains current is ¼ of the current of full power operation.

The method 500 begins at step 505 and continues to step 510. At step 510 input power is received by the converter (e.g., converter system 100). At step 515, the AC current and AC voltage are measured by a monitoring circuit (e.g., monitoring circuit 111). The measurements are sampled from an AC port 195 to measure the AC current and AC voltage of the AC mains. The measurements are sampled over time with sufficient data to be able to calculate phase shift and magnitude data for the voltages and currents. At step 520, the voltage and current of the line frequency energy storage (e.g., line-cycle energy storage capacitor 190) is measured by the monitoring circuit.

At step 520, the voltage across the line storage (e.g., line-cycle energy storage capacitor 190) is measured by the monitoring circuit over time. The current flow to and from the line storage may also be measured. At step 525, the voltage measured of the AC mains and the line storage is compared across the same time period.

At step 530, based on the comparison from step 525, the phase difference between the AC mains voltage and the voltage across the line storage is determined. At step 535, the phase difference is compared to a pre-determined value. As described above, the pre-determined value may be a 45° difference between the voltage waveforms. For example, the voltage bias across the line storage may lag the voltage of the AC mains.

At step 540, the method 500 determines whether the determined phase difference value is equal to the pre-determined value. If the values are not equal, the method 500 proceeds to step 545. At step 545, the switches in the cycloconverter (e.g., cycloconverter 170) of the converter system 100 are adjusted to control the current flow to or from the line storage. Adjustments include modifying the switching timing to extend or shorten a phase delay or lead of the voltage waveform of the line storage. The method 500 then reverts back to step 515.

Referring back to step 540, if the values of the phase differences are equal, the method 500 proceeds to step 550. At step 550 a determination is made as to whether to continue the method 500. If the method 500 is determined to continue, the method 500 reverts to step 515. Otherwise, the method 500 ends at step 555.

In other embodiments, the currents may be measured and compared. In such an embodiment, the phase-shift for the current to the line-cycle energy storage capacitor 190 should be lagging the current of the AC mains by 135 degrees. The pre-determined phase shift value may be stored in the controller 103.

Figure 6:
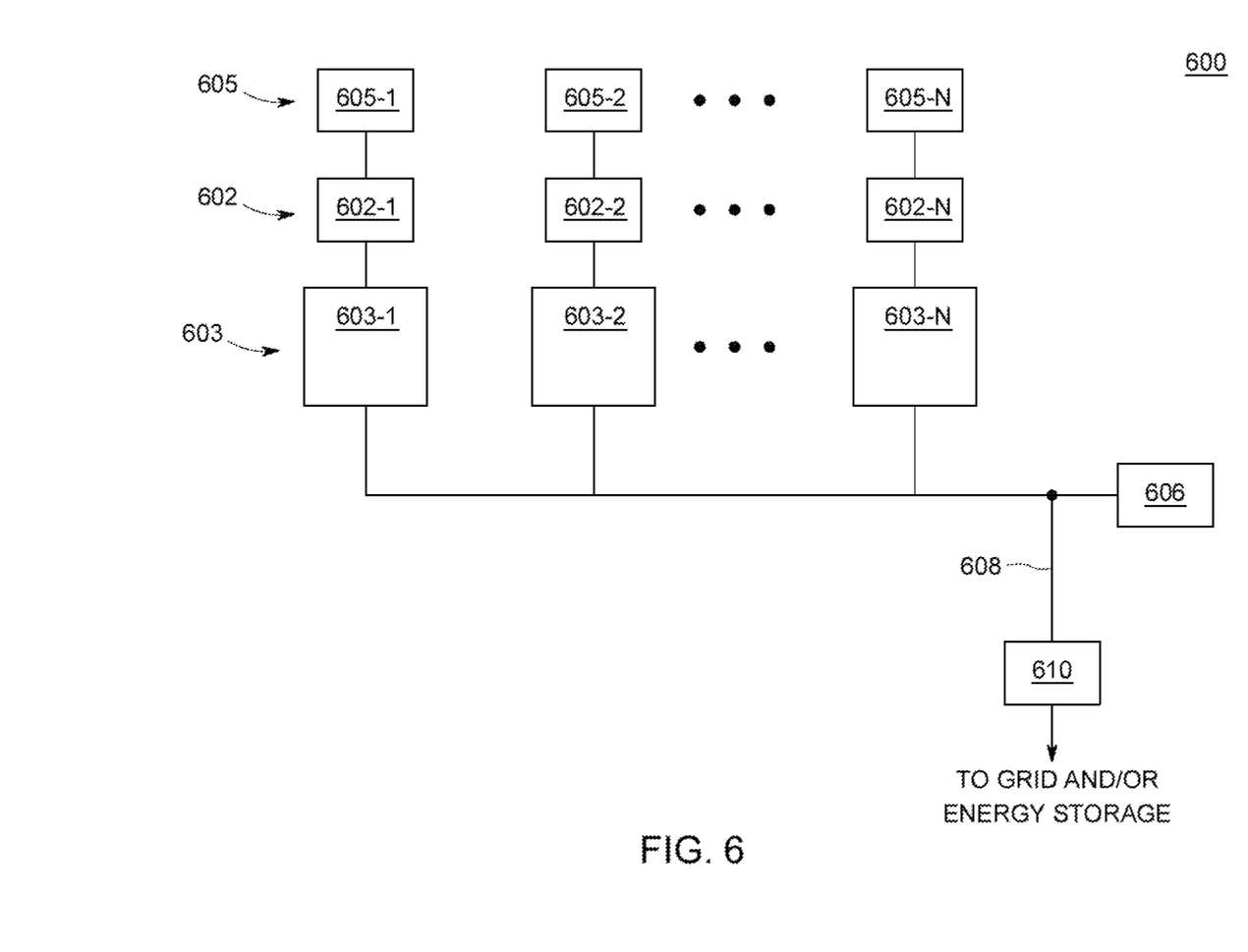
FIG. 6 is a block diagram of a line-cycle energy storage system in accordance to one or more embodiments of the present invention.

FIG. 6 is a block diagram of a line-cycle energy storage system 600 comprising one or more embodiments of the present invention. In some embodiments, the line-cycle energy storage system 600 also provides EMC and surge filtering in addition to the line-cycle energy storage. This diagram only portrays one variation of the myriad of possible system configurations and devices that may utilize the present invention. The present invention can be utilized in any system or device that employs maximum power point tracking for operating a power source at its maximum power point.

The system 600 comprises a plurality of power converters 602-1, 602-2 . . . 602-N, collectively referred to as power converters 602, a plurality of line-cycle storage circuits 603-1, 603-2, . . . 603-N, collectively referred to as line-cycle storage circuits 603; a plurality of distributed generators 605-1, 605-2 . . . 605-N, are collectively referred to as distributed generators 605; a system controller 606; a bus 608; and a load center 610. Distributed generators 605 may be any suitable generator that can be operated at a maximum power point such as photovoltaic, wind turbines, or other DC sources.

Each power converter 602-1, 602-2 . . . 602-N is coupled to a single distributed generator or group of distributed generators 605-1, 605-2 . . . 605-N, respectively. In some embodiments, each of the power converters 602 correspond to converters or cycloconverters as described above in FIGS. 1-3. In some other embodiments, the power converters 602 may be AC-DC converters. Each of the line-cycle storage circuits 603 corresponds to the line-cycle storage circuits and capacitors described above in FIGS. 1-3. The distributed generators 605 correspond to PV modules.

The power converters 602 are coupled to the system controller 606 via the bus 608. In some embodiments the line-cycle storage circuits 603 are coupled to the system controller 606 via the bus 608 for communicating with the system controller 606. The system controller 606 is capable of communicating with the power converters 602 by wireless and/or wired communication (e.g., power line communications) for providing operative control of the power converters 602. The power converters 602 are further coupled to the load center 610 via the bus 608. In some embodiments, the line-cycle storage circuits 603 are coupled to a gateway (e.g., the system controller 606) for external communications from the system 600 via PLC, wired, or wireless networks (not shown).

In some embodiments where the power converter 602 are DC-AC inverters, the power converters 602 are each capable of converting the received DC power to AC output. The power converters 602 couple the generated AC output power to the grid or energy storage via the bus 608. The generated power may then be distributed for use, for example to one or more appliances, and/or the generated energy may be stored for later use, for example using batteries, heated water, hydro pumping, $H_2O$-to-hydrogen conversion, or the like. In some alternative embodiments, the power converters 602 may be AC-DC power converters and the bus 608 is an AC bus delivering power to 605 that is a DC load.

In the system 600, each of the line-cycle storage circuits 603 monitors power converted to a storage device (e.g., a capacitor) as well as the AC power from bus 608.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is defined by the claims that follow.

The invention claimed is:

1. A method for line-cycle energy storage in a single-phase cycloconverter comprising:
receiving input power from an input port of the singe-phase cycloconverter;
monitoring an AC output port of the single-phase cycloconverter;
measuring energy stored in a line-cycle energy storage circuit coupled to one line of the AC output port of the single-phase cycloconverter;
determining a phase difference between a monitored AC voltage of the AC output port and a measured voltage of the line-cycle energy storage circuit; and
controlling switches in the single-phase cycloconverter to selectively store energy in the line-cycle energy storage circuit based on the phase difference.

2. The method of claim 1, wherein controlling switches further comprises operating the switches such that a voltage across the line-cycle energy storage circuit has a phase difference of 45 degrees when compared to the monitored AC voltage.

3. The method of claim 2, wherein a current of the line-cycle energy storage circuit has a current phase difference of 135 degrees when compared to a current of the monitored AC output port further coupled to an AC source.

4. The method of claim 1, wherein controlling switches further comprises operating the switches such that the magnitude of the monitored AC voltage is equal to the magnitude of the measured voltage of the line-cycle energy storage circuit.

5. The method of claim 1, wherein controlling switches further comprises operating in a reduced power mode wherein the magnitude of the voltage across the line-cycle energy storage circuit and magnitude of the current circulated through the line-cycle energy storage circuit is halved.

6. The method of claim 1, wherein controlling switches further comprises operating the switches such that a magnitude of a current of the line-cycle energy storage circuit is the same value as the magnitude of a current of the monitored AC output port coupled to an AC source.

7. The method of claim 1, wherein the received input power is a DC power and the AC output port is coupled to an AC source.

8. The method of claim 1, further comprising providing reactive power support and filtering through the line-cycle energy storage circuit comprising at least one line-cycle capacitor and at least one inductor coupled to the output port.

9. An apparatus operative to provide line-cycle energy storage in a single-phase cycloconverter comprising:
a controller operating pairs of switches of the single-phase cycloconverter;
a first pair, second pair, and third pair of switches coupled in parallel;
an AC output port coupled across the first pair and second pair of switches;
a line-cycle storage circuit coupled to the output port for single-phase operation; and
a monitoring circuit coupled to the controller, configured to measure voltages at the AC output port and the line-cycle storage circuit and maintain a predetermined phase difference between the measured voltages.

10. The apparatus of claim 9, wherein the line-cycle storage circuit comprises at least one line-cycle capacitor coupled between a line of the AC output port and the third pair of switches.

11. The apparatus of claim 10, wherein the controller operates the switches such that a voltage of the line-cycle storage circuit and a voltage of an AC source coupled to terminals of the AC output port have a phase difference of 45 degrees.

12. The apparatus of claim 10, wherein the controller operates the switches such that a current of the line-cycle storage circuit and a current of an AC source coupled to terminals of the AC output port have a phase difference of 135 degrees.

13. The apparatus of claim 10, wherein the line-cycle storage circuit is coupled between the AC output port and an AC source via a cable integrated with at least one capacitor and inductor.

14. The apparatus of claim 9, wherein the line-cycle storage circuit comprises at least one surge protection inductor serially coupled to each line of the single-phase output port, and at least one capacitor coupled in parallel between each line of the single-phase output port.

15. A system for line-cycle storage of a single-phase cycloconverter, comprising:
   at least one photovoltaic (PV) module;
   at least one cycloconverter, with an input port coupled to the at least one PV module, wherein each of the at least one cycloconverter employs:
      a controller operating pairs of switches of the single-phase cycloconverter;
      a first pair, second pair, and third pair of switches coupled in parallel;
      an AC output port coupled across the first pair and second pair of switches;
      a line-cycle storage circuit coupled to the output port for single-phase operation; and
      a monitoring circuit coupled to the controller, configured to measure voltages at the AC output port and the line-cycle storage circuit and maintain a predetermined phase difference between the measured voltages.

16. The system of claim 15, wherein the line-cycle storage circuit comprises at least one line-cycle capacitor coupled between a line of the AC output port and the third pair of switches.

17. The system of claim 16, wherein the controller operates the switches such that a voltage of the line-cycle storage circuit and a voltage of an AC source coupled to terminals of the AC output port have a phase difference of 45 degrees.

18. The system of claim 16, wherein the controller operates the switches such that a current of the line-cycle storage circuit and a current of an AC source coupled to terminals of the single-phase output port have a phase difference of 135 degrees.

19. The system of claim 16, wherein the line-cycle storage circuit further comprises two capacitors coupled to the first pair, second pair, and third pair of switches and a line of the single-phase output port.

20. The system of claim 15, wherein the line-cycle storage circuit comprises at least one surge protection inductor serially coupled to each line of the single-phase output port, and at least one capacitor coupled in parallel between each line of the AC output port.

* * * * *